United States Patent [19]
Friedland

[11] Patent Number: 4,888,705
[45] Date of Patent: Dec. 19, 1989

[54] SYSTEM FOR MEASURING THE POSITION OF VIBRATING OBJECT

[75] Inventor: Bernard Friedland, West Orange, N.J.

[73] Assignee: Kearfott Guidance and Navigation Corp., Little Falls, N.J.

[21] Appl. No.: 112,636

[22] Filed: Oct. 26, 1987

[51] Int. Cl.⁴ .............................................. G01C 19/64
[52] U.S. Cl. .................................... 364/508; 356/350
[58] Field of Search ............... 364/453, 508, 577, 149, 364/150; 356/350, 351

[56] References Cited

U.S. PATENT DOCUMENTS

| | | | |
|---|---|---|---|
| 4,132,482 | 1/1979 | Friedland | 356/350 |
| 4,243,324 | 1/1981 | Friedland | 356/350 |
| 4,248,534 | 2/1981 | Elbert | 356/350 |
| 4,456,376 | 6/1984 | Carrington et al. | 356/350 |
| 4,610,543 | 9/1986 | Ferriss | 356/350 |
| 4,740,084 | 4/1988 | Curby et al. | 356/350 |

*Primary Examiner*—Parshotam S. Lall
*Assistant Examiner*—Thomas G. Black
*Attorney, Agent, or Firm*—Kenyon & Kenyon

[57] ABSTRACT

A system for measuring the position of a vibrating object relative to a reference point, such as the block of a ring-laser gyroscope relative to its case, uses a continuous velocity sensor that is noisy and subject to drift and a precise position crossing detector. A mixer-filter combines the data from the two sensors so that the capability of the velocity sensor to provide a continuous reading of position is exploited to interpolate data between the instants that the position crossing detector indicates that the object position crosses through zero. The mixer-filter is implemented in the form of an extended Kalman filter which operates upon the inputs to provide an optimum estimate of the position of the vibrating object.

13 Claims, 5 Drawing Sheets

SYSTEM FOR MEASURING THE POSITION OF VIBRATING OBJECT

BACKGROUND OF THE INVENTION

This invention relates to a method and apparatus for measuring the position of a vibrating object. Specifically, the invention is applied to the field of ring-laser gyroscopes.

In many instances, it is desirable to know the position of a vibrating object relative to some reference point. Particularly, in a ring-laser gyroscope the sensing element ("gyro block") is dithered, i.e. forced into angular vibration in order to overcome the effect of "lock in". The amplitude of angular vibration can be of the order of 100 arc seconds. In some inertial navigation applications, it may be necessary to have an accurate knowledge of the position of the block as it is dithered relative to the case of the instrument to an accuracy of several arc seconds.

In a single-axis ring-laser gyro, the position of the block relative to the case is inferred by optical means in which the motion of the block relative to the case is subtracted from the total indicated motion of the gyro so that the read out is only the motion of the case of the gyro in inertial space. This technique is known as "optical compensation" and requires the use of optical components such as combiner prisms which are expensive to fabricate and difficult to adjust.

Optical compensation of a monolithic, three-axis ring-laser gyro is even more problematic than that of the single-axis gyro. Therefore, the desirability of achieving the same result as optical compensation by electronic means has been widely recognized.

SUMMARY OF THE INVENTION

As an improved alternative to optical compensation for dither in a ring-laser gyroscope, electrical means are implemented to subtract the motion of the gyro block relative to the gyro case. To accomplish this through the use of a signal processing computer requires an accurate knowledge of the gyro block position relative to the gyro case throughout the dither cycle.

A precision position estimate of the gyro block is accomplished in the present invention through the use of a position crossing detector such as a zero crossing and a velocity sensor. The velocity sensor provides a continuous velocity measurement. However, the measurement is too noisy and subject to drift to be integrated for the purpose of estimating the block position. The present invention combines the velocity sensor with an accurate position crossing detector. The position crossing detector can detect the precise instants that the block crosses a reference point to an accuracy of several arc seconds; however, the measurement can be made only once or twice per dither cycle.

The precise estimate of the position of the gyro block relative to the gyro case, to an accuracy level of that inherent in the position crossing detector, is achieved by combining the noisy, but continuous, data from the velocity sensor with the data from the accurate position crossing or level detector. The method of combining the data is based on the "extended" Kalman filter theory. The extended Kalman filter concept uses a model of the dynamic process the state of which is being estimated. Here, the dynamics of the dither hinge is used, thus incorporating the hard non-linearity of the position crossing detector into its equations.

The present invention provides the means for accurately interpolating continuous estimates of the position of an object through the use of a low accuracy velocity sensor and the knowledge of the dynamics i.e. natural frequency, damping factor, and driving signal of the vibrating object.

The application of the invention is not limited to use in a ring-laser gyro system. It can be used in any application where there is a need to accurately estimate the position of a vibrating object continuously, but where the only sensor with the requisite accuracy is a position crossing detector. The vibrations can either be angular or rectilinear.

DETAILED DESCRIPTION

Figure 1:
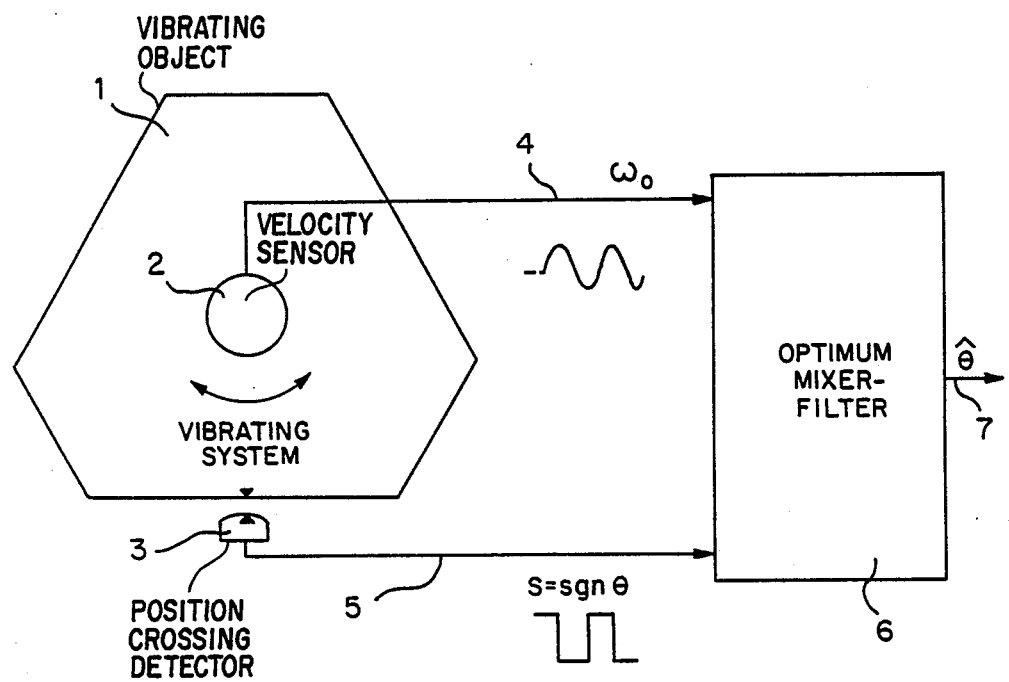
FIG. 1 is a schematic representation of the present invention.

A schematic diagram of the invention is shown in FIG. 1. It consists of the vibrating object 1 e.g. a ring-laser gyroscope, with two sensors, a velocity sensor 2 and a position crossing detector 3. The velocity sensor output $\omega_0$, on line 4 and the position crossing detector output s, on line 5 are the inputs to a mixer filter 6. The mixer filter 6 combines the signals from the two sensors to provide an optimum estimate $\hat{\theta}$ on line 7 of the position of the vibrating object.

The operation of the mixer-filter is in accordance with the theory of the extended Kalman filter which is explained in a number of books, such as "Stochastic Processes and Filtering Theory," by A. H. Jazwinski, Academic Press, 1970.

The velocity sensor 2 produces a continuous reading of the velocity of the vibrating object, but this sensor is typically subject to random, high-frequency noise. In addition, the sensor is subject to drift and scale factor uncertainty which may depend on temperature and other environmental factors. Consequently, an accurate determination of the position of the object by integrating the output of the velocity sensor would not be feasible. A position crossing detector 3, on the other hand, can be fabricated to provide a very stable indication of the precise instant at which the vibrating object crosses a specified reference (which can be defined as zero). But the position-crossing detector provides no information regarding the position of the vibrating object at other instants of time. The function of the mixer-filter 6 is to optimally combine the data from the two sensors so that the capability of the velocity sensor to provide a continuous reading of velocity is exploited to interpolate data between the instants that the position crossing detector indicates that the object position crosses through zero. Another way of interpreting the operation of the mixer-filter, is that the signal from the position crossing detector is used to "clamp" the integrated output of the velocity sensor.

The mixer-filter 6 is implemented in the form of an extended Kalman filter which operates upon the data from the two sensors on lines 4 and 5 and the drive signal to provide an optimum estimate $\hat{\theta}$ on line 7 of the position of the vibrating object.

In order to apply the theory of the extended Kalman filter to the design of the mixer-filter, it is assumed that the vibrating object can be represented by the differential equation:

$$d^2\theta/dt^2 + 2\zeta\Omega d\theta/dt + \Omega^2\theta = S(u+v_1) \tag{1}$$

where $\theta$ is the position of the vibrating object relative to a known reference position, u is the drive signal, $v_1$ is random noise at the drive in addition to the known drive u, $\zeta$ is the damping factor of the system, and $\Omega = 2\pi f$ where f is the frequency of vibration in Hz.

The velocity sensor is assumed to measure the instantaneous velocity of the vibrating object, but with additive noise and bias as given in the following equation:

$$\omega_0 = d\theta/dt + b + w_1 \tag{2}$$

where $\omega_0$ is the measured velocity, b is the bias (drift) and $w_1$ is the random noise on the velocity sensor. For purpose of design of the filter, the bias b is assumed to be a random walk which can be modeled by the differential equation:

$$db/dt = v_2 \tag{3}$$

where $v_2$ is another white noise source.

The output s of the position crossing detector is assumed to be expressed by:

$$s = sign(\theta + w_2) \tag{4}$$

where $w_2$ is still another white noise source. The numerical value of $w_2$ is adjusted in the design process to approximate the error of the position crossing detector.

Using equations (1) through (4) as the design model, the extended Kalman filter is expressible by the differential equations:

$$d\hat{\omega}/dt = Su - 2\zeta\Omega\hat{\omega} - \Omega^2\hat{\theta} + k_{11}r_s + k_{12}r_\omega \tag{5}$$

$$d\hat{\theta}/dt = \hat{\omega} + k_{21}r_s + k_{22}r_{107} \tag{6}$$

$$d\hat{b}/dt = k_{31}r_s + k_{32}r_{107} \tag{7}$$

where $$r_s = s - sign(\hat{\theta}) \tag{8}$$

$$r_{107} = \omega_0 - \hat{b} - \hat{\omega} \tag{9}$$

are the "residuals", i.e., the differences between the measured quantities and the estimates thereof within the extended Kalman filter.

In particular, if the residuals $r_s$ and $r_\omega$ were zero, equations (5) through (7) would constitute a model of the process that is generating the measurements $\omega_0$ and s; $\hat{\omega}$ and $\hat{s} = sign(\hat{\theta})$ are models of the measurements of the angular velocity and the sign of the displacement, respectively. Thus zero values of the residuals would be indicative of the fact that the model is a faithful representation of the actual measurement, and hence that the "estimated state variables" of the model are valid representations of the true phyical variables and the estimates thereof in the mixer-filter. The residuals, multiplied by the gains are fed back to the inputs of the integrators, and tend to be driven toward zero. The numerical values of the gains in the gain elements are calculated prior to construction of the system. When the gains are calculated in accordance with (10) through (12) below, the mixer-filter will be stable.

The matrix K which contains the six gains $k_{11}$ through $k_{32}$ is computed using the following formula:

$$K = \begin{bmatrix} k_{11} & k_{12} \\ k_{21} & k_{22} \\ k_{31} & k_{32} \end{bmatrix} = PC'W^{-1} \tag{10}$$

where W is a diagonal matrix representing the noise on the measurements, C is the "observation matrix", in this application given by $$C = \begin{bmatrix} 4/\pi\,a & 0 & 0 \\ 0 & 1 & 1 \end{bmatrix} \tag{11}$$

and P is the "covariance matrix" corresponding to the filter, which is the solution to the matrix quadratic equation:

$$AP + PA' - PC'W^{-1}CP + V = O \tag{12}$$

where A is the "dynamics matrix" corresponding to the system, and is given by $$A = \begin{bmatrix} 0 & 1 & 0 \\ -\Omega^2 & -2\zeta\Omega & 0 \\ 0 & 0 & 0 \end{bmatrix} \tag{13}$$

and V is a diagonal matrix that represents the spectral density of the noise on the dynamics.

The numerical values of these noise spectral densities are used to control the bandwidth of the mixer-filter and are not very critical. The factor $4/\pi\,a$ in the C matrix (11) comes from statistical linearization of the sign function; a is the approximate amplitude of the oscillation.

Software is widely available for obtaining the numerical solution of the variance equation. Using such software, with the following numerical data:

$$\zeta = 0.01$$

$$\Omega = 2\pi 100 \text{ rad/sec}$$

and $$V = diag\,[0., 1000., 0.01]$$

$$W = diag\,[0.5 \times 10^{-3}, 0.5 \times 10^{-3}]$$

following gain matrix is obtained:

$$K = \begin{bmatrix} 0.145 & 0.0494 \\ 17.24 & 3028 \\ 1.445 & 9.464 \end{bmatrix}$$

which produces a mixer-filter with poles at complex frequencies of $-1642 \pm j2003$ rad/sec. The numerical values of the gains are only exemplary. Other gains, obtained by solving (10) and (12) can be found that will give acceptable performance. Actual performance can be fine tuned via detailed simulation studies.

It is noted that the output s of the position crossing detector, and $\hat{s} = \text{sign}(\hat{\theta})$ both vary between $-1$ and $+1$ (or between other equal positive and negative values). Consequently, the residual $r_s$ consists of pulses: a positive pulse when $\theta$ is positive and $\hat{\theta}$ is negative ($\theta$ leads $\hat{\theta}$), and a negative pulse when $\theta$ is negative and $\hat{\theta}$ is positive ($\theta$ lags $\hat{\theta}$). The width of the pulse is indicative of the phase difference between $\theta$ and $\hat{\theta}$. Thus the effect of the feedback of the residual is to null out the phase difference between the true displacement $\theta$ and the estimate of the displacement $\hat{\theta}$, which is the mixer-filter output. In nulling out the phase difference between $\theta$ and $\hat{\theta}$, the estimate of the displacement tracks the true displacement accurately throughout the cycle of oscillation.

Figure 2:
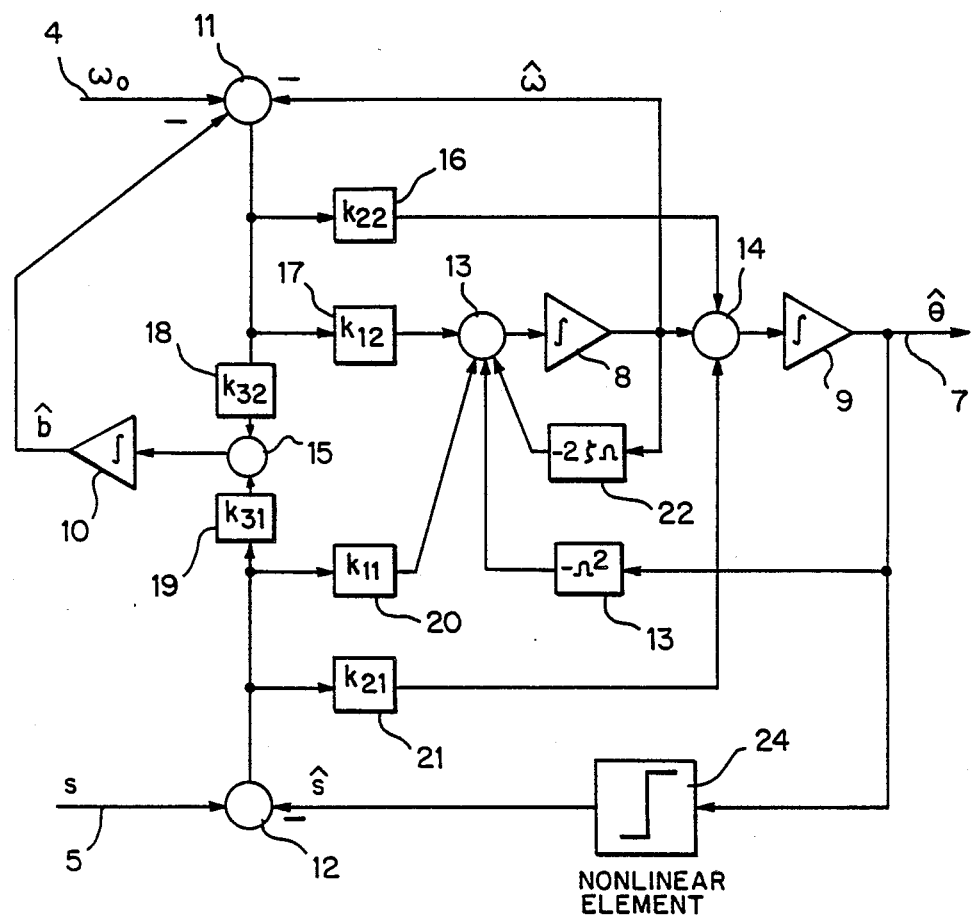
FIG. 2 is a schematic representation of the mixer-filter of FIG. 1.

A schematic analog representation of the mixer-filter 6 using the extended Kalman algorithm is shown in FIG. 2 and consists of integrators 8, 9, 10, summing junctions 11, 12, 13, 14, 15, gain elements 16 through 23 and a non-linear element 24.

The signals from the velocity sensor 2 and position crossing detector 3 are fed to summing junctions 11 and 12 respectively. The output signal from junction 11 is the residual $r_\omega$ which is separately multiplied by gains 17, 16 and 18 and fed through summing junctions 13, 14 and 15 back to integrators 8, 9 and 10 respectively.

The output signal from junction 12 is the residual $r_s$ which is separately multiplied by gains 20, 21 and 19 and fed through summing junctions 13, 14 and 15 back to integrators 8, 9 and 10 respectively. Feeding back the residuals through the gain elements ($k_{11}$ through $k_{32}$) to the integrators tends to drive the residuals toward zero.

The output of integrator 8 is the velocity estimate $\hat{\omega}$. The integrator 8 receives its input from junction 13 which is the sum of the residuals $r_\omega$ and $r_s$ multiplied by their respective gains 17 and 20, and a feedback from the velocity and position estimate signals multiplied by their respective gains 22 and 23.

The output of integrator 9 is the position estimate $\hat{\theta}$. The integrator 9 receives its input from junction 14 which is the sum of the velocity estimate signal and the residuals $r_\omega$ and $r_s$ multiplied by their respective gains 16 and 21.

The output of integrator 10 is the bias (drift) estimate $\hat{b}$. The integrator 10 receives its inputs from junction 15 which is the sum of the residuals $r_{107}$ and $r_s$ multiplied by their respective gains 18 and 19. The residual $r_\omega$ is output from junction 11 which is the measured velocity $\omega_0$ minus the bias estimate $\hat{b}$ and the velocity estimate $\hat{\omega}$.

Residual $r_s$ is output from junction 12 which is the position crossing detector output s minus the sign of the displacement $\hat{s}$. The sign of the displacement $\hat{s}$ is output from non-linear element 24 which has as its input the position estimate signal $\hat{\theta}$. The non-linear element 24 takes the sign of the position estimate signal $\hat{\theta}$ at its input and is of particular importance for the operation of the system.

It should be noted that FIG. 2 is schematic only. In the implementation of this analog circuit, it may be necessary to use additional elements for proper scaling of the variables, for sign changing, and for other operations that are well-known in analog computation. It is also possible to implement the functions shown in FIG. 2 by means of a digital signal processor or a combination of digital and analog components that realize the mathematical functions depicted in FIG. 2. The mathematical equations that must be implemented by the digital processor are implicit in the analog circuit of FIG. 2.

Figure 3:
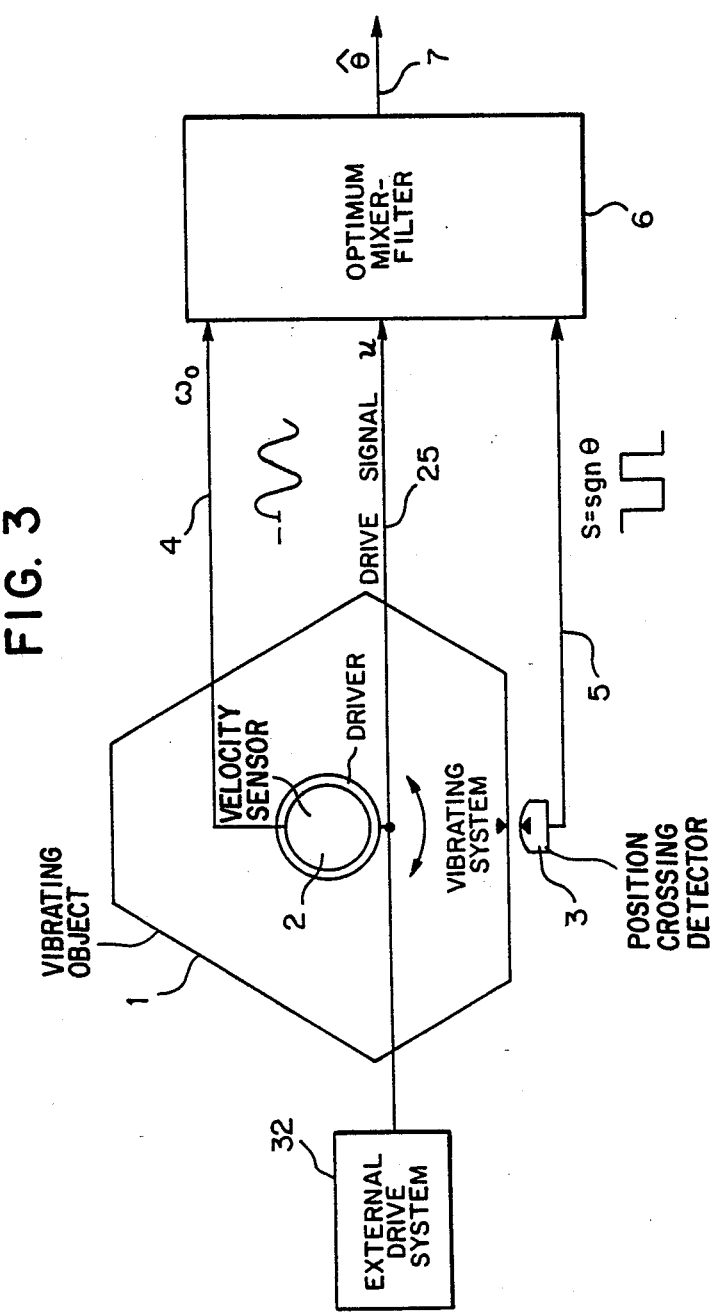
FIG. 3 is a schematic representation of an embodiment of the present invention incorporating an external drive system.
Figure 4:
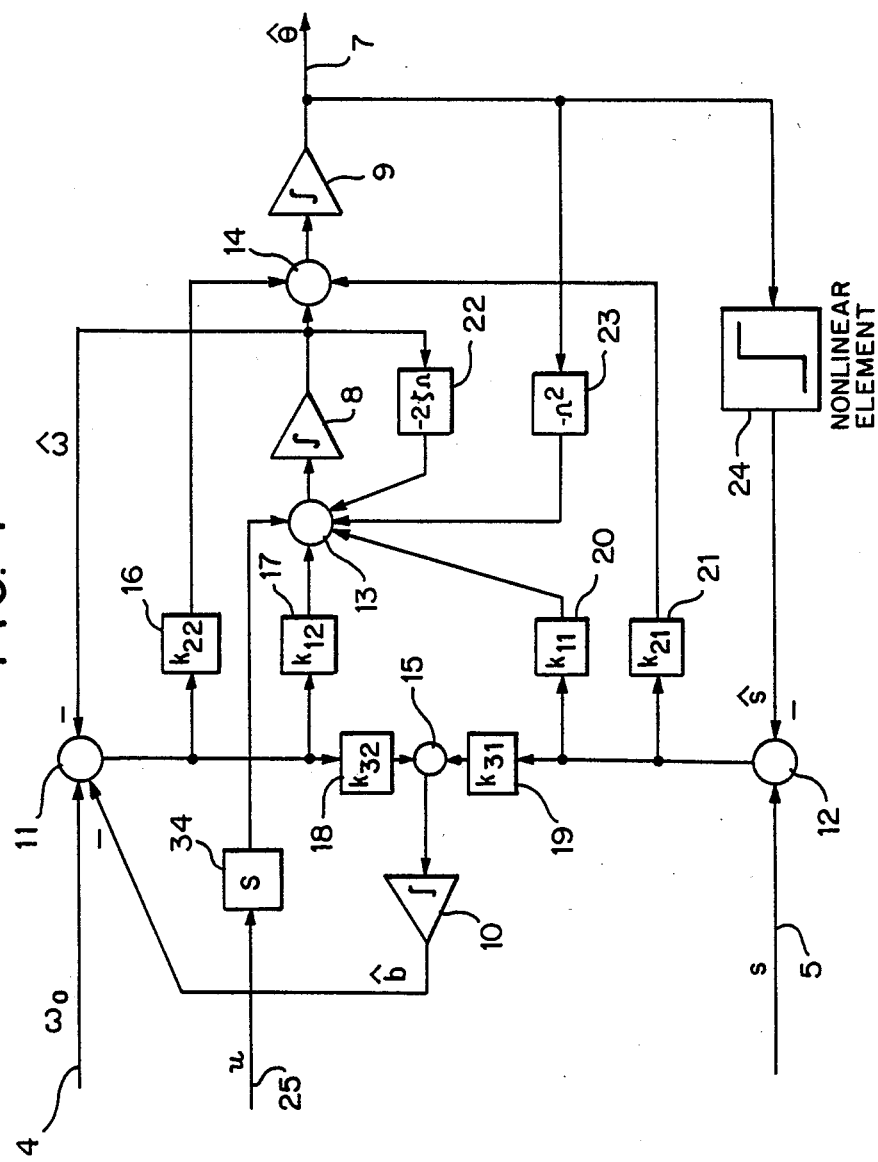
FIG. 4 is a schematic representation of the mixer filter of FIG. 3.

FIG. 3 is a schematic diagram of an embodiment of the invention including an external drive system 32 to produce a drive signal u, on line 25, the drive signal being incorporated in the above equations, for sustaining the oscillation of the vibrating system. The performance of the mixer filter can be improved by using the drive signal as an additional input to the mixer filter 6. This drive signal u on line 25, multiplied by the drive scale factor S provides another input to integrator 8 as shown in FIG. 4. The schematic block diagram of FIG. 4 is the same as that of FIG. 2, but including the additional drive signal input u, multiplied by a factor S in block 34, and fed to summing junction 13.

It is readily apparent that it is possible to substitute a level-crossing detector for a zero crossing detector, where the level detected by the level-crossing detector is any level within the range of motion of the vibrating object. Moreover, it is possible to combine the outputs of several level-crossing detectors, each of which "triggers" at a different level within the range of motion of the vibrating object. The signals $s_i$ ($i=1,\ldots,N$) from each of the N different level-crossing detectors are compared with the corresponding estimates $\hat{s}_i$.

The residuals, i.e., the differences between the corresponding measured and estimated quantities, are multiplied by appropriate gains and fed into the inputs of the integrators that are used in the realization of the mixer-filter. An exemplary illustration showing the implementation of the system with two level-crossing detectors is given in FIG. 5 which shows the additional components for the second channel: an additional level crossing detector signal $s_i$ on line 35, another non-linear element 33, a differencing element 26, three gain elements 27, 28, 29 and two summing junctions 30, 31.

Figure 5:
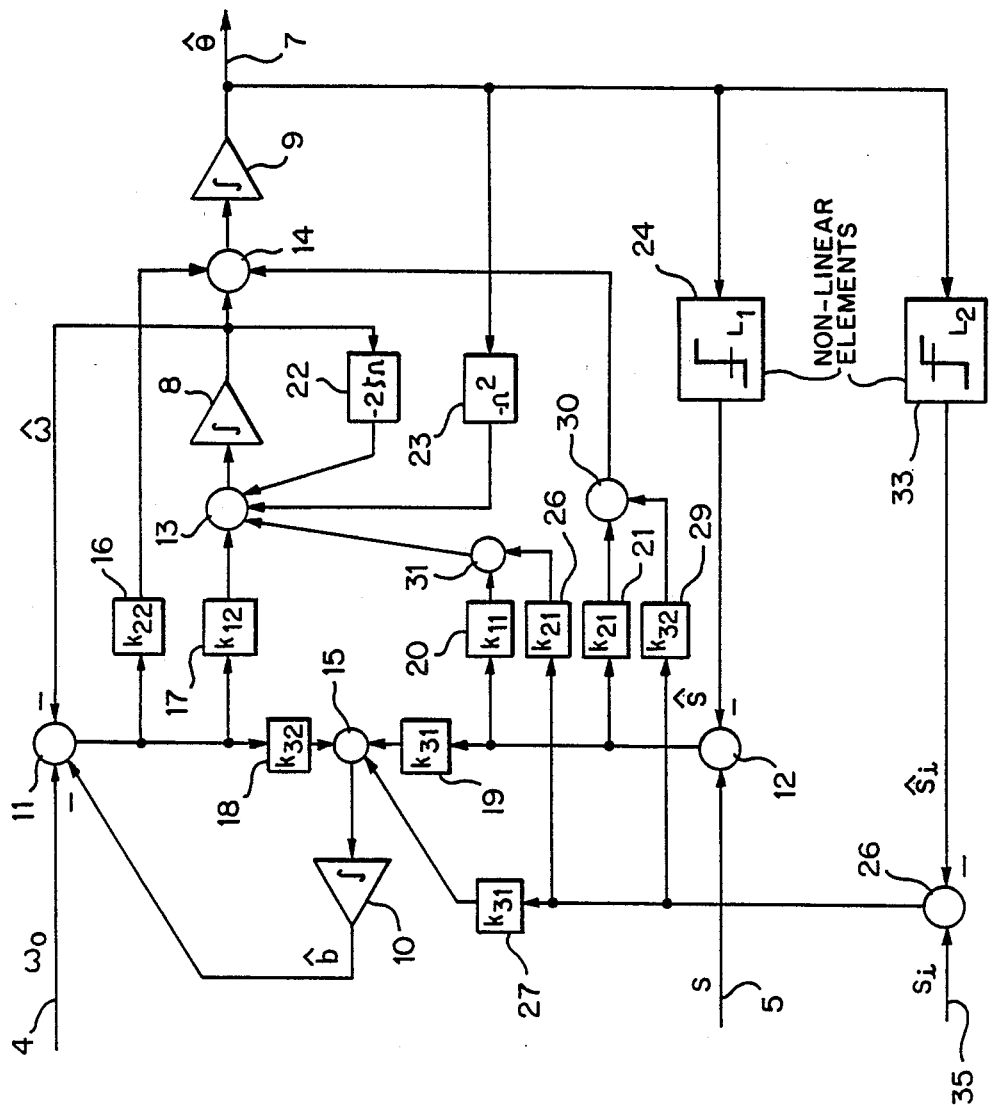
FIG. 5 is a schematic representation of the mixer filter of FIG. 1 incorporating two position-crossing detectors.

FIG. 5 incorporates the additional level crossing detector into FIG. 2. The additional level crossing detector signal $s_i$ is fed to a junction 26 having as its output a residual $r_s$. The other input to junction 26 is the output of the additional non-linear element 33 which has the position estimate signal $\hat{\theta}$ as its input. The outputs of the nonlinear elements switch from positive values to negative values at the same levels as the level-crossing detectors that provide the inputs to the corresponding summary junctions. The residual $r_{si}$ is fed through gain elements 27, 28 and 29 to junctions 15, 31 and 30 respectively. Extra junctions 30 and 31 serve to combine the residuals from the other level crossing detector before outputting the sum to junctions 14 and 13 respectively.

The equations (5)-(9) can either be implemented using analog circuitry as shown in FIG. 2 or through the use of a digital microprocessor. If a microprocessor is to be used, the time derivatives in equations (5)-(7) would be approximated by finite differences. For example, $$d\hat{\theta}/dt \simeq [\hat{\theta}(nT) - \hat{\theta}(nT-T)]/T \qquad (14)$$

$$d\hat{\omega}/dt \simeq [\hat{\omega}(nT) - \hat{\omega}(nT-T)]/T \qquad (15)$$

$$d\hat{b}/dt \simeq [\hat{b}(nT) - \hat{b}(nT-T)]/T \qquad (16)$$

where T is the sampling interval, which must be small enough so that the errors introduced by the approximations of expressions (14)–(16) are not excessive. Since the measured velocity $\omega_0$ is an analog quantity, an analog-to-digital converter is used to convert the velocity signal to a digital word. The output of the position crossing detector is already a digital (i.e., logical) variable and hence does not need to be converted for use in a microprocessor implementation of the mixer-filter.

As fully described above, a unique feature of this invention is the combination of position crossing signals (which are very accurate, but quantized to only two levels) with inaccurate, but continuous, velocity signals to provide a continuous estimate of the position of a vibrating object. The resulting estimate maintains the accuracy of the position crossing detector continuously throughout the vibration of the object.

Further, the extended Kalman algorithm is used to optimally combine the signals from the position crossing detector and the velocity sensor.

The application of this invention is not limited to ring-laser gyros. It can be used in any application where there is a need to accurately estimate the position of a vibrating object continuously, but where the only available sensor with the requisite accuracy is a position crossing detector. This invention provides the means for accurately interpolating continuous estimates of the position of the object through the use of a low-accuracy velocity sensor, and the knowledge of the dynamics (i.e., the natural frequency, damping factor, and driving signal) of the vibrating object.

What is claimed is:

1. An apparatus for measuring the position of a vibrating object in a dynamic process, comprising:
    (a) a velocity sensor continuously measuring the velocity of the object, said velocity sensor providing as an output signal a continuous signal indicative of the velocity of said object;
    (b) a non-linear detector for detecting the object position and providing as an output signal a precise signal each time the object crosses a set reference position; and
    (c) a non-linear mixer-filter receiving said output signals from said velocity sensor and said non-linear detector, said non-linear mixer-filter operating on said continuous velocity signal and said precise signal by incorporating a model of the dynamic process generating said output signals wherein a continuous optimum estimate of the position of the vibrating object is produced.

2. An apparatus according to claim 1 wherein an extended Kalman algorithm is implemented by said non-linear mixer-filter to combine said output signals.

3. An apparatus according to claim 2 wherein said object is a ring laser gyro block.

4. An apparatus according to claim 2 wherein said means for detecting is a position crossing detector.

5. An apparatus according to claim 2 further comprising an external drive system sustaining the vibrations of said object, and wherein an output signal from said drive system is coupled as an additional input to said non-linear mixer-filter.

6. An apparatus according to claim 2 further comprising an additional non-linear detector for detecting the object position and providing an additional precise signal when the object crosses a different set reference position, and wherein said additional precise signal is coupled to said non-linear mixer filter.

7. An apparatus according to claim 6 wherein said additional non-linear detector is a position crossing detector.

8. A method for measuring the position of a vibrating object in a dynamic process, comprising the steps of:
    (a) providing as an output from a velocity sensor a continuous signal indicative of the velocity of said vibrating object;
    (b) providing from a non-linear detector for detecting the object position a precise signal when the object crosses a set reference position;
    (c) combining said continuous velocity and precise signals in a non-linear mixer filter by incorporating a model of the dynamic process; and
    (d) providing an optimum estimate from said non-linear mixer filter of the position of said vibrating object.

9. A method according to claim 8 wherein said step of combining said continuous velocity and precise signals is carried out through the use of an extended Kalman filter algorithm.

10. A method according to claim 9 wherein said step of providing from a non-linear detector for detecting the object position a precise signal when the object crosses a set reference level is carried out with a position crossing detector.

11. A method according to claim 9 further comprising the step of:
    (e) providing a drive signal to said non-linear mixer-filter from an external drive system used to sustain the vibrations of said object.

12. A method according to claim 9 further comprising the step of:
    (f) providing from an additional non-linear detector for detecting the object position an additional precise signal when the object crosses a different set reference position, and wherein said additional precise signal is coupled to said non-linear mixer filter.

13. A method according to claim 12 wherein said step of providing from an additional non-linear detector detecting the object position an additional precise signal when the object crosses a different set reference level is carried out by a position crossing detector.

* * * * *